G. S. LANE.
RELIEF VALVE.
APPLICATION FILED AUG. 17, 1920.
1,412,473.
Patented Apr. 11, 1922.
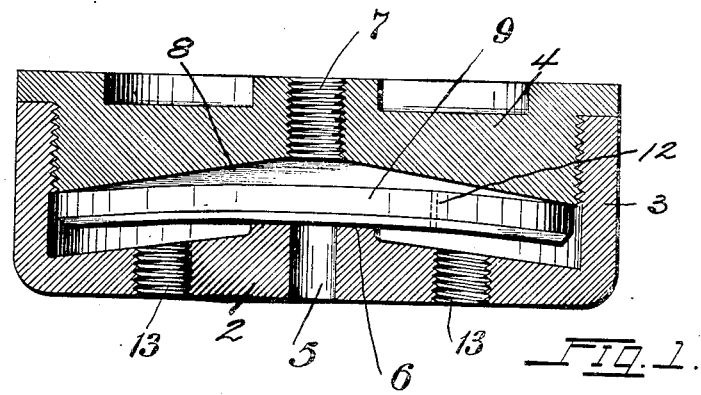
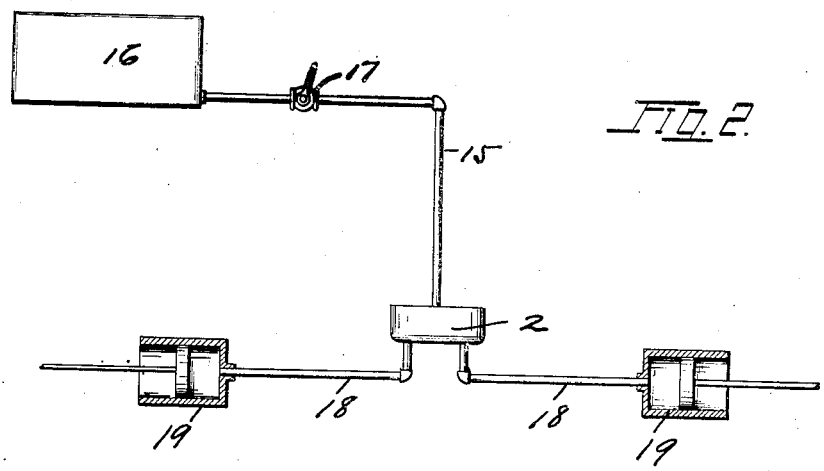
WITNESS
INVENTOR
George S. Lane.
BY
his ATTORNEYS

UNITED STATES PATENT OFFICE.

GEORGE S. LANE, OF SAN FRANCISCO, CALIFORNIA, ASSIGNOR, BY MESNE ASSIGNMENTS, TO THE WESTINGHOUSE AIR BRAKE COMPANY, OF WILMERDING, PENNSYLVANIA, A CORPORATION OF PENNSYLVANIA.

RELIEF VALVE.

1,412,473.   Specification of Letters Patent.   Patented Apr. 11, 1922.

Application filed August 17, 1920. Serial No. 404,053.

*To all whom it may concern:*

Be it known that I, GEORGE S. LANE, a citizen of the United States, and a resident of the city and county of San Francisco, State of California, have invented a certain new and useful Relief Valve, of which the following is a specification.

The invention relates to relief valves and particularly to quick acting instantaneous relief valves.

An object of the invention is to provide a simple relief valve that operates instantaneously to release pressure.

Another object of the invention is to provide a relief valve having only one moving part.

Another object of the invention is to provide a relief valve, operable from a remote point, to instantly relieve pressure at a selected part of a system.

The invention possesses other advantageous features, some of which, with the foregoing, will be set forth at length in the following description, where I shall outline in full, that form of the invention which I have selected for illustration in the drawings accompanying and forming part of the present specification. In said drawings, I have shown one specific form of valve of my invention, but it is to be understood that I do not limit myself to such form, since the invention, as expressed in said claims, may be embodied in a plurality of forms.

Referring to said drawings:

Figure 1 is a vertical section through one form of valve of my invention.

Figure 2 is a diagrammatic representation of the valve in its environment.

The valve of my invention comprises a casing, preferably metallic, formed of a base 2 having a circumferential flange 3 and a cap 4 screwed to and forming a tight fit with the flange. The base is provided centrally with a local exhaust port 5 and the inner surface of the base surrounding the port 5 is raised to form a smooth annular valve seat 6, the remainder of the inner surface of the base being depressed below the valve seat. The cap is provided centrally with an inlet port 7 for air under pressure and the smooth inner surface 8 of the cap is sloped or inclined upwardly from its periphery to the inlet port 7.

Disposed in the chamber between the base and the cap is a flexible, resilient valve disc 9, preferably formed of flexible material, such as a medium grade of soft rubber, of sufficient thickness to retain its shape. The disc normally seats on the valve seat 6 and is normally flexed downwardly toward the periphery, by the under marginal portion of the cap, thus pressing the valve against the seat 6. The valve disc is of less diameter than the chamber within the casing, so that its edge will not bind against the side of the casing, and is preferably beveled on its lower edge to prevent binding when the valve is displaced. It is desirable, but not essential, that provision be made for a slight leakage past the valve disc and this may be accomplished by slightly grooving the upper face of the valve along a portion of its marginal portion or by providing a small aperture 12 through the disc. The base is provided with one or more ports 13, for the passage of air under pressure, and these ports open on the depressed portion of the inner face of the base.

The supply conduit 15 for the air, or other fluid, under pressure, is connected to the inlet port 7, and the conduit is provided between the source of air under pressure 16 and the valve casing with a three-way valve 17 whereby the supply of air to the port 7 may be cut off, or the port 7 may be placed in communication with the supply 16 or with the atmosphere. The devices in which the air under pressure is to be used to do work are connected to the ports 13 by conduits 18, and these devices 19 may be of any nature whatsoever.

When the valve 17 is turned to admit air under pressure to the port 7, this air presses the marginal portion of the valve disc 9 downward and passes around the disc, equalizing the pressure on both sides thereof, and flows through the ports 13 to the connected devices. Since the pressure on both sides of the valve disc is equalized, it is held to its seat on the local exhaust port 5, so that no escape of the air occurs. When the flow of air inwardly through the port 7 ceases, the marginal portion of the valve disc seats against the under side of the cap, due to the resiliency of the flexed disc. When it is desired to release the air from the devices 19, the control valve 17 is turned to release the air in the chamber above the valve disc and the pressure of the air in the devices and their connecting conduits raises the valve disc at the center, lifting it from the seat 6 and opening the exhaust port 5, which remains open until equilibrium, or substantial equilibrium, is established on opposite sides of the disc, at which time it is again seated on the seat 6, due to its resiliency. The advisability of slight leakage past the valve disc is due to the possibility of leakage in the valve 17 or the conduit 15 which would otherwise cause the valve disc to be unseated when the pressure above the disc fell below the pressure below the disc.

As soon as the control valve is turned to release the pressure in the conduit 15, the disc is unseated from the valve seat 6 and the air under pressure in the devices 19 discharges immediately. The valve 17 releases the pressure from the line only and the relief valve immediately releases the remaining pressure, so that the pressure in the devices may be instantly released by the operation of a remote control valve.

In the drawings, I have referred to the element 2 as the base and the element 4 as the cap, but it is apparent that the valve casing may be inverted, without in any manner interfering with the operation of the valve.

I claim:

1. A relief valve comprising a casing having an inlet port on one side and an exhaust port and an outlet port on the other side, a valve seat surrounding the exhaust port and a flexible resilient valve disc seated on valve seat and interposed between the inlet and exhaust ports.

2. A relief valve comprising a casing having an inlet port on one side and an exhaust port and an outlet port on the other side, a valve seat surrounding the exhaust port and a flexible resilient valve disc disposed between the inlet and exhaust ports engaging said seat at its central portion and being pressed toward said seat at its marginal portion.

3. A relief valve comprising a casing having an inlet port on one side and an exhaust port and an outlet port on the other side, a valve seat surrounding the exhaust port and an inherently flat flexible resilient valve disc disposed in said casing between the inlet and exhaust ports and being flexed to press at its central portion against said seat.

4. A relief valve comprising a casing having a chamber therein, a raised valve seat on one side of the interior of said casing, a depressed valve seat on the other side of the interior of said casing, and a resilient valve in said casing normally held flexed and bearing against said raised valve seat.

5. A relief valve comprising a casing, an inlet port on one side of said casing, an exhaust port and an outlet port on the other side of the casing, a valve seat surrounding the exhaust port and a flexible resilient valve disc engaging said valve seat and interposed between said inlet and outlet ports and spaced from said outlet port.

6. A relief valve comprising a casing, an inlet port on one side of said casing, a depressed valve seat surrounding said inlet port, and exhaust port and an outlet port on the other side of the casing, a raised valve seat surrounding said exhaust port and a flexible valve disc engaging said depressed valve seat at its marginal portion and engaging said raised valve seat at its central portion.

7. A relief valve comprising a casing, an inlet port on one side of said casing, a depressed valve seat surrounding said inlet port, and exhaust port and an outlet port on the other side of the casing, a raised valve seat surrounding said exhaust port and a flexible valve disc engaging said raised seat at its central portion and being pressed toward said raised valve seat at its marginal portion, by contact with the marginal portion of said depressed valve seat.

8. A relief valve comprising a cup provided with an outlet port and a centrally disposed exhaust port, a raised valve seat surrounding said exhaust port, a resilient valve disc seated on said valve seat and a cap screwed to said cup and having an inlet port and depressing said valve disc at its marginal portion.

9. A relief valve comprising a chambered casing having an upper wall sloping upwardly toward an inlet port at the center and having a lower wall having an exhaust port and an outlet port, a raised valve seat surrounding the exhaust port and a rubber disc engaging said valve seat and being flexed downwardly by marginal contact with said upper wall.

In testimony whereof, I have hereunto set my hand at San Francisco, California, this 9th day of August 1920.

GEORGE S. LANE.

In presence of—
ROBERT LEE BEVERIDGE,
M. E. EWING.